United States Patent
Miyazawa et al.

(10) Patent No.: US 7,548,279 B2
(45) Date of Patent: Jun. 16, 2009

(54) VIDEO SIGNAL PROCESSOR

(75) Inventors: Hirotoshi Miyazawa, Kumagaya (JP); Akihiro Matsumoto, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 746 days.

(21) Appl. No.: 11/305,156

(22) Filed: Dec. 19, 2005

(65) Prior Publication Data
US 2006/0158565 A1     Jul. 20, 2006

(30) Foreign Application Priority Data
Dec. 20, 2004    (JP) ............................. 2004-368214

(51) Int. Cl.
*H04N 9/73* (2006.01)
*H04N 9/64* (2006.01)
(52) U.S. Cl. .................... 348/656; 348/708; 348/690
(58) Field of Classification Search ................ 348/607, 348/624, 625, 630, 655, 656, 679, 687, 690, 348/708, 645, 649; 358/518, 520; 382/162, 382/167; *H04N 5/21, 9/68, 9/64, 9/73*
See application file for complete search history.

(56) References Cited

U.S. PATENT DOCUMENTS 5,357,279 A * 10/1994 Nakamura et al. .......... 348/687
5,619,280 A     4/1997 Yamashita et al.
5,691,779 A    11/1997 Yamashita et al.

FOREIGN PATENT DOCUMENTS

JP          2002-64839       2/2002

* cited by examiner

*Primary Examiner*—Sherrie Hsia
(74) *Attorney, Agent, or Firm*—Finnegan, Henderson, Farabow, Garrett & Dunner, L.L.P.

(57) ABSTRACT

In the event that the maximum Imax of R, G, B color signals is detected and the maximum value Imax is equal to or higher than the suppression start level Vcs which is lower than a predetermined level to be restricted, a suppression gain is generated in accordance with the value of this maximum Imax, and by this suppression gain Gc, R, G, B color signals to be inputted are simultaneously suppressed. By this, color signals can be restricted to the predetermined range and outputted without impairing white balance.

10 Claims, 5 Drawing Sheets

VIDEO SIGNAL PROCESSOR

CROSS-REFERENCE TO RELATED APPLICATIONS

This application is based upon and claims the benefit of priority from prior Japanese Patent Application No. 2004-368214, filed Dec. 20, 2004, the entire contents of which are incorporated herein by reference.

BACKGROUND OF THE INVENTION

1. Field of the Invention

The present invention relates to a video signal processor, which properly suppresses color signals of, for example, R (red), G (green), B (blue), etc. without impairing white balance.

2. Description of the Related Art

As is generally known, in an apparatus, which displays various videos such as TV (television) receivers, processing to amplify R, G, B and other color signals and to adapt them to the dynamic range of a display unit is carried out.

For this kind of device, for example, in Jpn. Pat. Appln. KOKAI Publication No. 2002-64839, a peak clip circuit which carries out clip operation without impairing white balance is disclosed.

In this publication, when the maximum value in three color signals of R, G, and B is detected and the maximum value exceeds the displayable level, clipping is made with care to prevent white balance from being impaired by attenuating the maximum value to the displayable level and applying the same attenuation rate to other two colors.

In the publication mentioned above, it is possible to prevent white balance from being impaired but I/O characteristics, which unnaturally vary in the vicinity of displayable level result.

To describe specifically, when the maximum level of input signal does not reach the displayable level, the signal is outputted as it is.

On the contrary, when the maximum level of input signal exceeds the displayable level, attenuating operation works and by the attenuation operation, input signals have the level, for example, the level of the portion slightly exceeding the displayable level, attenuated to a level smaller than this displayable level.

Consequently, for example, in the event that three color signals of R, G, B that correspond to a color video in one frame are inputted, and the maximum level in these color signals fluctuates up and down, the outputted signal does not reflect this up and down fluctuation characteristics but the portion in which the input level forms a high peak is conversely suppressed to be low.

That is, the invention according to this publication may provide output characteristics, which do not properly reflect input characteristics in the vicinity of the boundary to choose whether or not the attenuation operation, should be carried out.

BRIEF SUMMARY OF THE INVENTION

According to one aspect of the present invention, there is provided a video signal processor comprising: a first detector unit configured to detect the maximum signal level in multiple color signals to be inputted; a suppression start level setting unit configured to set the suppression start level to start suppression of signal level in the multiple color signals; a second detector configured to detect that the maximum signal level in multiple color signals becomes higher than the suppression start level; and a suppression unit configured to suppress the multiple color signals in common by the use of gains which suppress the maximum signal level within the range from the suppression start level to a predetermined level which exceeds the suppression start level.

DETAILED DESCRIPTION OF THE INVENTION

Referring now to drawings, embodiments according to the present invention will be described in detail as follows.

First Embodiment

Figure 1:
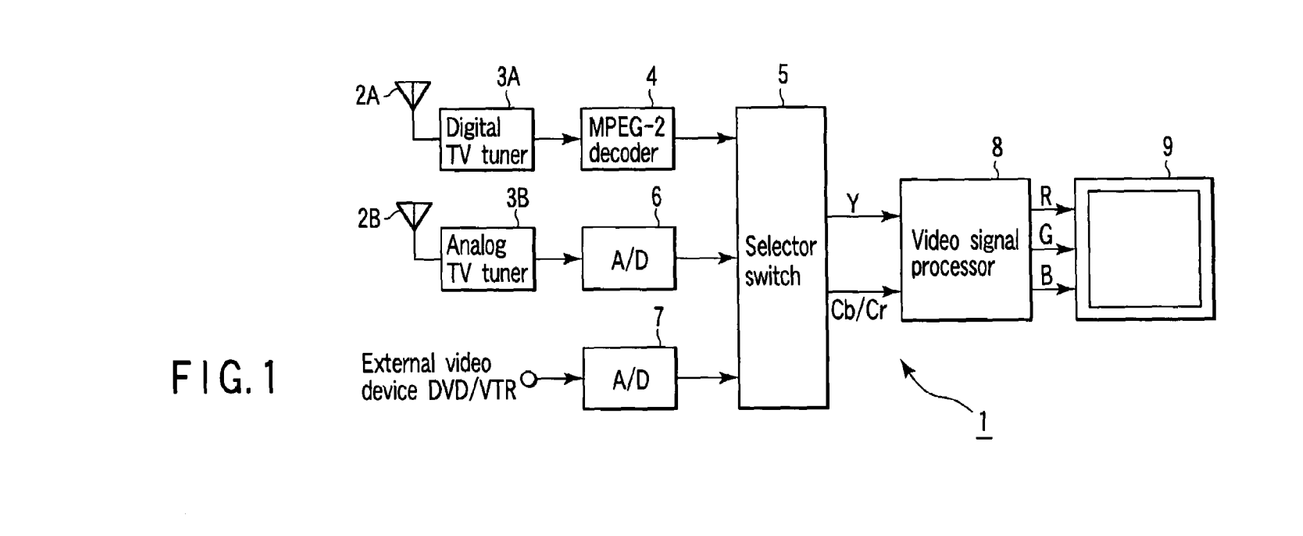
FIG. 1 is a block diagram that shows a configuration of a TV receiver equipped with the first embodiment according to the present invention.
Figure 2:
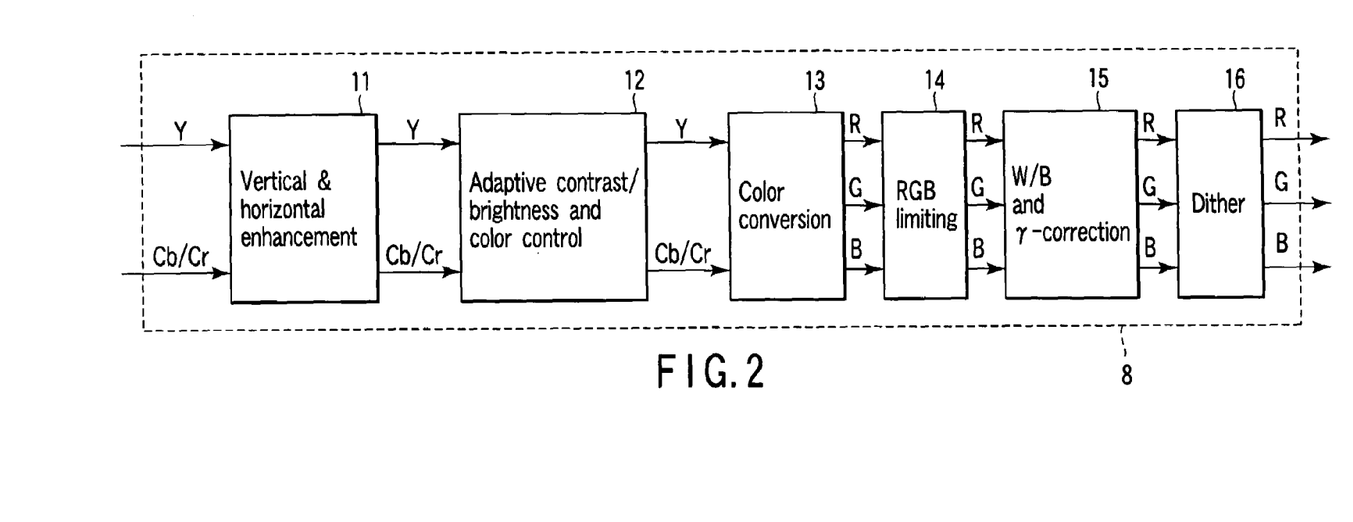
FIG. 2 is a block diagram that shows a configuration of a video signal processor of the first embodiment in the TV receiver.
Figure 3:
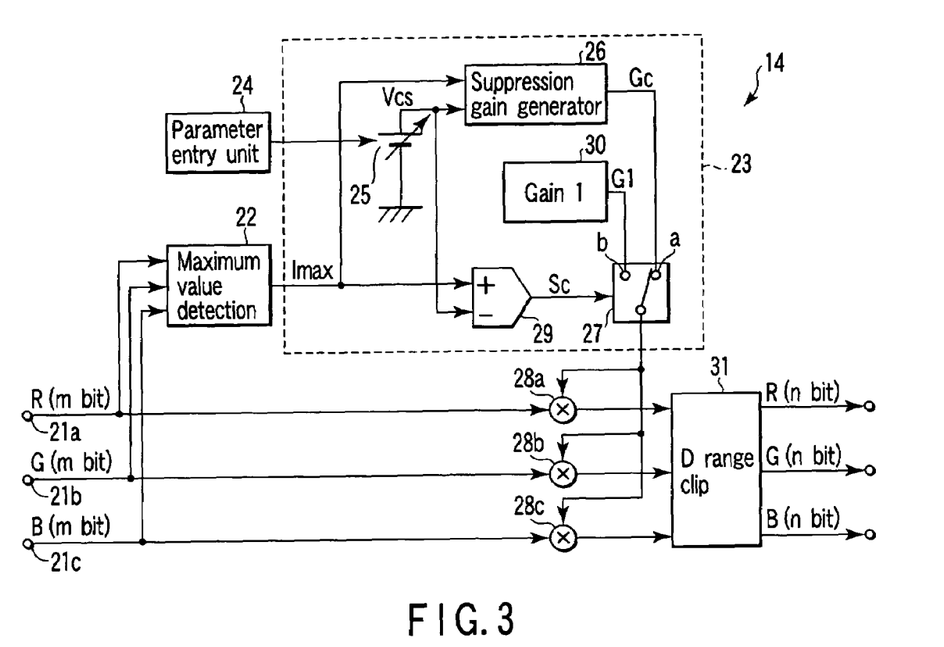
FIG. 3 is a general configuration diagram of an RGB limiting circuit in the first embodiment.
Figure 4:
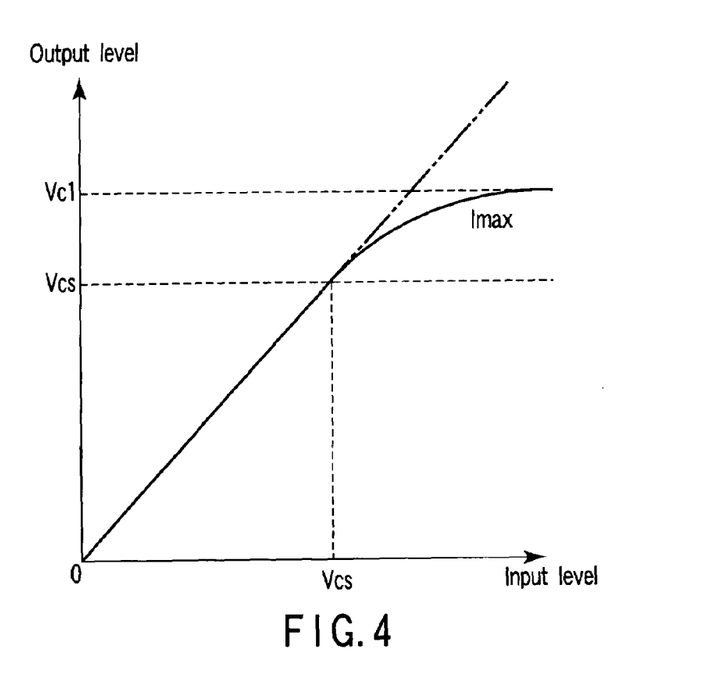
FIG. 4 is a diagram that illustrates I/O characteristics in the RGB limiting circuit.
Figure 5:
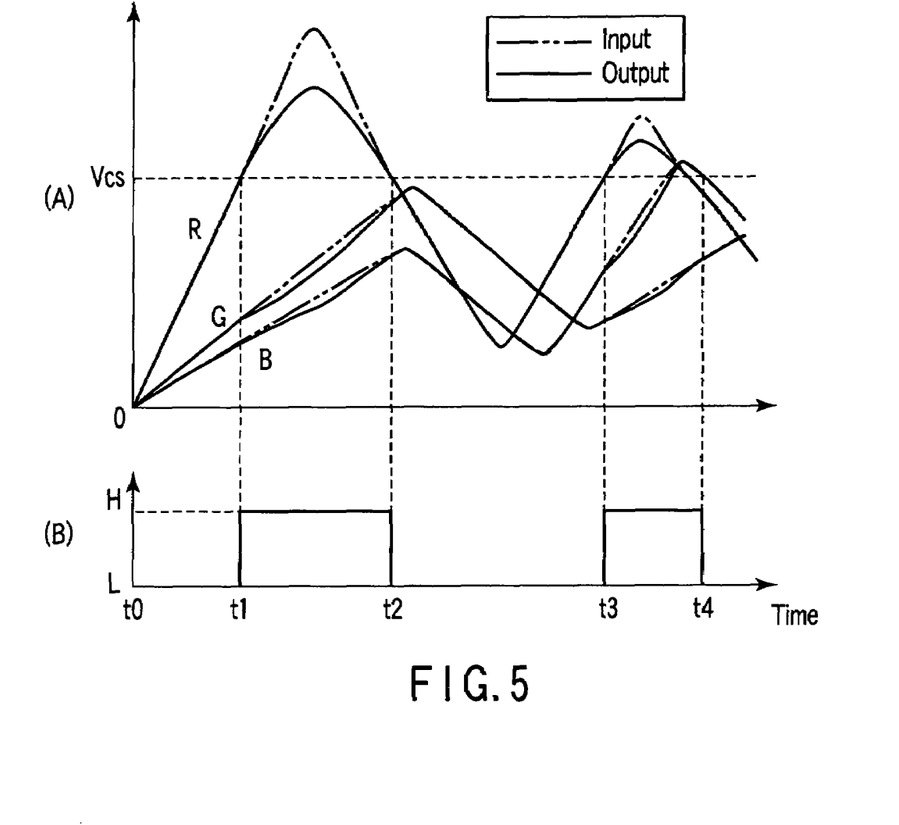
FIG. 5 is an operation illustration that indicates output waveform, etc. of the RGB limiting circuit when RGB signal that varies with time is inputted.

FIGS. 1 to 5 relate to the first embodiment according to the present invention, and FIG. 1 shows the configuration of a TV receiver equipped with the first embodiment according to the present invention, FIG. 2 shows a configuration of an video signal processor of the first embodiment in the TV receiver, FIG. 3 shows general configuration of an RGB limiting circuit in the first embodiment, FIG. 4 illustrates I/O characteristics in the RGB limiting circuit, and FIG. 5 shows output operation examples in the RGB limiting circuit when RGB signal that varies with time is inputted.

The TV receiver 1 shown in FIG. 1 has a digital TV tuner 3A and analog TV tuner 3B connected to antennas 2A and 2B, respectively. MPEG-2 transport stream signals selected and demodulated by the analog tuner 3A are inputted in an MPEG-2 decoder 4 and decoding processing such as expansion, for MPEG-2 is carried out. Digital video signals decoded by the MPEG-2 decoder 4 are inputted to a selector switch 5.

In addition, video signals selected and demodulated by an analog TV tuner 3B are inputted into the selector switch 5 after passing an A/D converter 6 and being converted from analog signals to digital signals.

Furthermore, video signals from external video apparatus such as VTR, DVD players are inputted into the selector switch 5 after passing an A/D converter 7 and being converted from analog signals to digital signals.

The selector switch 5 selects video signals to be inputted by the selecting operation by a user and outputs to a video signal processor 8.

To this video signal processor 8, video signals are inputted in signal forms, such as luminance signal Y and color-difference signal Cb/Cr.

This video signal processor 8 carries out signal processing such as vertical and horizontal enhancement, color conversion on inputted signals, dynamic range limiting processing, and other signal processing to three primary RGB primary color signals, and converts to signals suited for video display, and outputs to a digital display device 9 comprising an LCD, plasma display.

By this, this digital display device 9 can display video pictures received by the digital TV tuner 3A, analog TV tuner 3B or external video apparatus onto a display screen of this digital display device 9.

FIG. 2 shows the configuration of this video signal processor 8. Luminance signal Y and color-difference signal Cb/Cr to be inputted from the selector switch 5 are inputted in a vertical & horizontal (contour) enhancement circuit 11, and after contours (or structures) in the vertical and horizontal directions are emphasized, they are inputted into an adaptive contrast/brightness & color control circuit 12.

This adaptive contrast/brightness & color control circuit 12 corrects contrast and brightness of luminance signal Y and at the same time, carries out correction control on the color difference signal Cb/Cr side by being adapted to this correction in order to properly correct the I/O characteristics of luminance signal Y and color difference signal Cb/Cr and output the results to the color conversion circuit.

This color conversion circuit 13 converts luminance signal Y and color difference signal Cb/Cr into R, G, B color signals (3 primary color signals), and then, outputs to the RGB limiting circuit 14. This RGB limiting circuit 14 suppresses the dynamic range of input signals, which have a wider dynamic range in order to adjust to the displayable gradation range (dynamic range) of the digital display device 9.

R, G, B color signals outputted from this RGB limiting circuit 14 are inputted in a W/B and γ-correction circuit 15. This W/B and γ-correction circuit 15 not only adjusts R, G, B color signals to be inputted to the white balance (abbreviated W/B) state but also carries out γ-correction that corresponds to the display characteristics of digital display device 9 on the subsequent stage side.

R, G, B color signals outputted from this W/B & γ-correction circuit 15 are inputted in a dither circuit 16. This dither circuit 16 carries out, for example, dither processing as gradation compression processing in order to improve display characteristics by the digital display device 9. And R, G, B output signals which are gradation-compressed by this dither circuit 16 are inputted in the digital display device 9 and on the display surface of this digital display device 9, video pictures of video signals inputted in the video signal processor 8 are color-displayed.

FIG. 3 shows specific configuration of the RGB limiting circuit 14 in FIG. 2.

This RGB control circuit 14 outputs R, G, B color signals as m-bit input signals by limiting to R, G, B output signals with n-bit dynamic range, where m is greater than n. That is, on the output side of this RGB control circuit 14, there is a display element of n-bit (smaller than m) dynamic range and the RGB limiting circuit 14 compresses (suppresses) the signals to the narrower dynamic range to adapt them to the dynamic range.

R, G, B color signals inputted to input terminals 21a, 21b, and 21c, respectively, are inputted in a maximum value detection circuit 22. This maximum value detection circuit 22 detects the maximum Imax of all R, G, B signals inputted in the RGB limiting circuit 14.

The maximum value Imax of color signals detected by this maximum value detection circuit 22 is inputted in a suppression gain generator unit 23, which creates a suppressing gain to narrow the dynamic range by suppressing a signal level exceeding the predetermined level.

This suppression gain generator unit 23 is connected to a parameter entry unit 24, which establishes the suppression start level Vcs to start the suppression to the maximum signal level.

When a user varies a parameter value of the parameter entry unit 24, the parameter is inputted in a suppression start level generator circuit 25 in the suppression gain generator unit 23. Then, the suppression start level generator circuit 25 generates a reference potential of the suppression start level Vcs, which corresponds to the value of the parameter inputted.

This suppression start level Vcs is inputted in a suppression gain generator circuit 26, which generates a suppression gain Gc which suppresses all the color signals by a common gain when color signals exceeding the level, are inputted. In addition, to this suppression gain generator 26, the maximum value Imax of color signals detected in the maximum value detection circuit 22 is inputted, too.

This suppression gain generator circuit 26 generates the suppression gain Gc which has characteristics in that the gain becomes 1 when the maximum value I max level of color signal is not more than the suppression start level Vcs and the gain decreases as the value exceeding the suppression start level Vcs increases. Specifically, the suppression gain Gc that corresponds to the value obtained by subtracting the suppression start level Vcs from the maximum value Imax of color signals is generated.

This suppression gain Gc is inputted into multipliers 28a, 28b, 28c, respectively, via a selector switch 27.

To each of multipliers 28a, 28b, 28c, R, G, B color signals, which are inputted to input terminals 21a, 21b, and 21c, respectively are inputted, too. And each of multipliers 28a, 28b, 28c multiply R, G, B color signals by suppression gain Gc inputted via the selector switch 27 and outputs the product.

In addition, the suppression gain generator unit 23 possesses a comparator 29, which determines whether or not the maximum value Imax of color signals outputted from the maximum value detection circuit 22, is not less than Vcs. This comparator 29 compares the maximum value Imax with the suppression start level Vcs, and outputs the comparison result, the selector signal Sc (see symbol (B) in FIG. 5), for example, in the case of Imax≧Vcs, and controls change-over of the selector switch 27 by this selector signal Sc.

To one contact a of this selector switch 27, the suppression gain Gc is inputted and to the other contact b, gain G1 which is the unit of a unit gain generator circuit (abbreviated as gain 1 in FIG. 3) 30 is inputted so that color signals function in the same manner as they are allowed to pass multipliers 28a, 28b, 28c.

In addition, R, G, B color signals outputted from multipliers 28a, 28b, 28c are inputted in a dynamic range clip circuit (abbreviated as D range clip in FIG. 3) 31.

This dynamic range clip circuit 31 clips the maximum value in R, G, B color signal outputs from multipliers 28a, 28b, 28c to the $2^n$ predetermined level Vc1 and outputs when they exceed the predetermined level to which the maximum value should be limited, that is, $2^n$.

FIG. 4 shows I/O characteristics when the maximum value Imax of color signals is inputted from the RGB limiting circuit 14 of FIG. 3.

In this first embodiment, when the maximum value Imax of color signals is smaller than the suppression start level Vcs, the contact b of the selector switch 27 is kept to be in ON state and gain-1 I/O characteristic state results.

Consequently, when the maximum value Imax of color signals is smaller than the suppression start level Vcs, the maximum value Imax of color signals inputted is outputted as it is.

On the contrary, when the maximum value Imax of color signals is not less than the suppression start level Vcs, the contact a of the selector switch 27 is kept to the ON state by the selector signal Sc and the maximum value Imax of color signals inputted is outputted after multiplying by the suppression gain Gc by a multiplier 28$i$ (28$i$ indicates a multiplier to which the maximum value Imax of color signals is inputted).

Consequently, when the maximum value Imax of color signals is not less than the suppression start level Vcs, the I/O characteristics in the case of gain 1 shown by the chain double-dashed line are changed to the I/O characteristics shown by the solid line. In addition, when the maximum Imax is not less than the predetermined level Vc1, it is clipped by the dynamic range clip circuit 31 and becomes the output signal not more than the predetermined level Vc1.

In the first embodiment, the suppression gain Gc is set in such a manner that the suppression gain Gc value changes in accordance with the level value of maximum value Imax of color signals that exceed the suppression start level Vcs and decreases nearly continuously as the value that exceeds the suppression start level Vcs increases.

In such event, at a level smaller than the suppression start level Vcs where suppression is started, the suppression gain Gc is set to the same value where no suppression is carried out, that is, to gain 1, and thereby at the level where the suppression gain Gc is smaller than the suppression start level Vcs, it becomes the same value as that when no suppression is carried out.

In addition, as shown in the I/O characteristics of FIG. 4, the suppression gain Gc is set in such a manner as to keep the monotone increasing characteristics in which when the input level increases, the output increases, too.

By the way, in the first embodiment, in the event that the maximum value Imax of color signals is not less than the suppression start level Vcs, R, G, B color signals are suppressed in this way but it is outputted by being clipped to the predetermined level Vc1 shown in FIG. 4 by the dynamic range clip circuit 31 so that the maximum value Imax level when it is suppressed does not exceed the dynamic range that can be processed on the latter stage side.

Operations of the first embodiment according to this kind of configuration will be described. The user can select optional video signals such as video signals of digital TV broadcasting, video signals of analog TV broadcasting, and video signals of external video apparatus by selection using the selector switch 5 in the TV receiver 1.

The selected video signals are displayed in the form of video pictures on the display surface of the digital display device 9 after undergoing various kinds of signal processing, such as contour enhancement in vertical and horizontal directions, color conversion, color signal limiting processing to match displayable gradations of the digital display device 9 for color converted R, G, B color signals, carried out by the video signal processor 8.

In such event, the RGB limiting circuit 14 carries out the following action. Symbol (A) in FIG. 5 indicates R, G, B color signals varied with time and inputted to this RGB limiting circuit 14 in chain double-dashed lines and output signals in such event in solid lines.

In addition, symbol (B) in FIG. 5 shows the selection signal Sc which is outputted from the comparator 29 in accordance with the case of symbol (A) in FIG. 5. When this selection signal Sc becomes "H," the gain inputted in multipliers 28$a$, 28$b$, and 28$c$ by this selection signal Sc is changed over from gain 1 to gain Gc. And operation to suppress signals to be inputted is carried out. By the way, the abscissa in FIG. 5 shows the elapsing time.

In the example shown in symbol (A) in FIG. 5, from time t0 to time t1, from time t2 to time t3, and after t4, the maximum value Imax of color signals is less than the suppression start level Vcs, and because in such event, the selector signal Sc is not outputted (it is "L"), multipliers 28$a$, 28$b$, 28$c$ multiply by gain 1 for the input signal and output.

Consequently, each color signal of R, G, B inputted is outputted as it is. That is, in such event, as shown in symbol (A) in FIG. 5, the input waveform and output waveform are superimposed (the chain double-dashed line is superimposed on the solid line).

On the contrary, the R color signal which becomes the maximum Imax of color signals reaches the suppression start level Vcs at time t1, and in the period from this time t1 to t2, the R color signal is equal to or higher than the suppression start level Vcs.

Consequently, as shown in symbol (B) in FIG. 5, in the period from this time t1 to t2, the comparator 29 outputs the selection signal Sc to make the suppression gain Gc be inputted in multipliers 28$a$, 28$b$, and 28$c$.

As described above, this gain Gc is the gain 1 at the suppression start level Vcs but is set in such a manner that the gain becomes smaller than 1 as the value exceeding the suppression start level Vcs increases. Therefore, the greater the value exceeding the suppression start level Vcs, the greater is the R color signal to be suppressed. Consequently, the R color signal shown in the chain double-dashed line is suppressed to a waveform as shown in the solid line.

In such event, G, B color signals in addition to R color signal are suppressed in the same manner by the suppression gain Gc. Consequently, according to the first embodiment, color signals, which exceed the suppression start level Vcs, can be suppressed without impairing white balance.

In the case of other time period from t3 to t4, when the maximum value of color signal exceeds the suppression start level Vcs, they are suppressed in common by the suppression gain Gc.

According to the first embodiment which achieves this kind of action, the suppression start level Vcs of a level lower than the predetermined level Vc1 which should restrict the dynamic range is established, and when the maximum Imax in multiple color signals to be inputted exceeds this suppression start level Vcs, suppression is started and at the same time, the greater the value exceeding the suppression start level Vcs, the greater is the level to be suppressed.

Consequently, as shown in the I/O characteristic diagram shown in FIG. 4, it is possible to obtain the output signal that can achieve smooth output characteristics, which can reflect input characteristics more properly.

For example, when the input signal continuously crosses the suppression start level Vcs, the output signal shows continuous waveform, and thereby the output signal, which is reflecting the input characteristics more properly than usual, can be obtained. In addition, by suppressing other color signals in the same manner by the gain when the maximum Imax is suppressed, it is possible to prevent white balance from being impaired.

Figure 6:
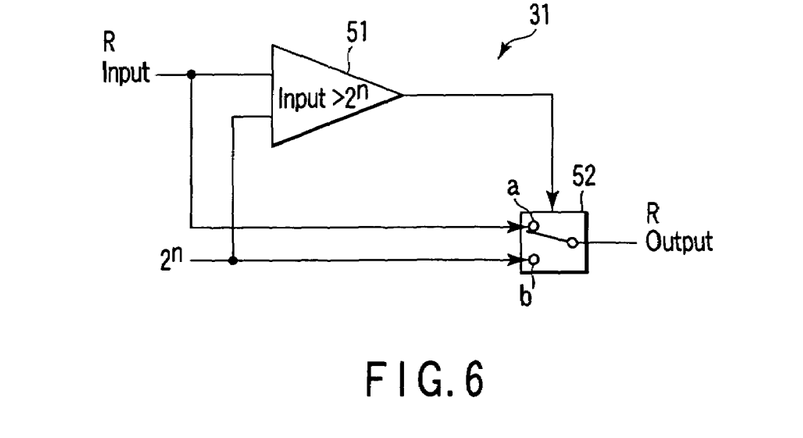
FIG. 6 is a diagram that indicates a configuration of a dynamic range clip circuit.

By the way, the dynamic range clip circuit 31 shown in FIG. 3 can be achieved by the processing configuration shown in FIG. 6. The R color signal to be inputted is inputted in a comparator 51 which composes the dynamic clip circuit 31 and is compared with the predetermined level Vc1 of $2^n$, which serves as the limiting level, and at the same time, this R color signal is applied to the contact a of switch 52. In addition, to the contact b of this switch 53, the signal of $2^n$ predetermined level Vc1 is applied, and by the comparison output of the comparator 51, contact change-over of switch 52 is controlled.

That is, when the R color signal level is equal to or lower than the $2^n$ predetermined level Vc1, the R color signal is outputted as it is via the contact "a" of switch 52. On the other hand, when the R color signal exceeds the $2^n$ predetermined level Vc1, the switch 52 is changed over to the condition where the contact b can be selected by the comparison output of comparator 51, and a signal of a level limited (clipped) to the $2^n$ predetermined level Vc1 is outputted. By the way, in FIG. 6, the case of R color signal is indicated, but the same configuration is applied to cases of G, B color signals, too.

Consequently, by the configuration of FIG. 6, it is possible to control the signal to the $2^n$ predetermined level Vc1 by a simple circuit configuration.

Second Embodiment

Next, with referring to FIGS. 7 and 8, a second embodiment of the present invention will be described. The second embodiment achieves the functions of the RGB limiting circuit 14 of FIG. 3 by the use of software.

Figure 7:
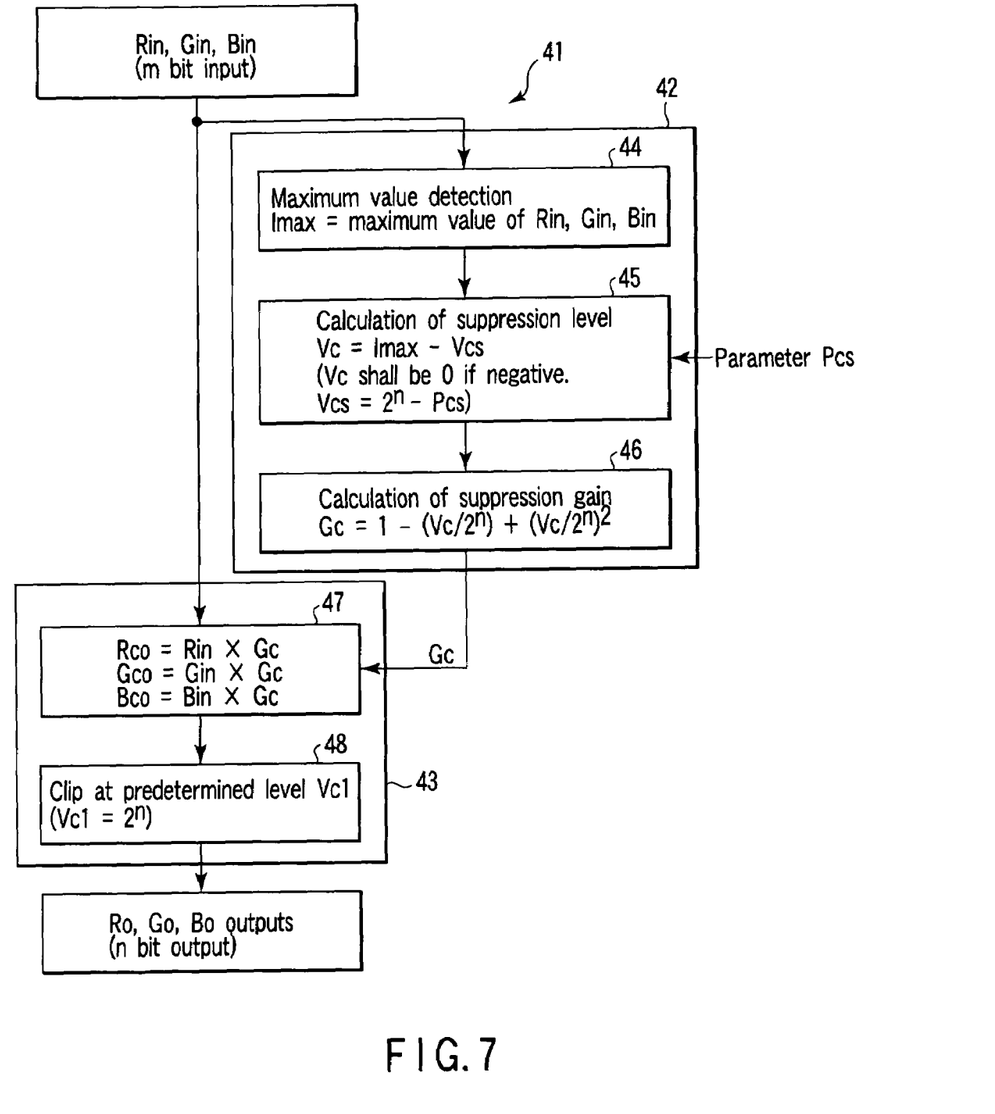
FIG. 7 is a diagrammatic configuration diagram of a processor unit, which carries out RGB limiting processing in the second embodiment according to the present invention.
Figure 8:
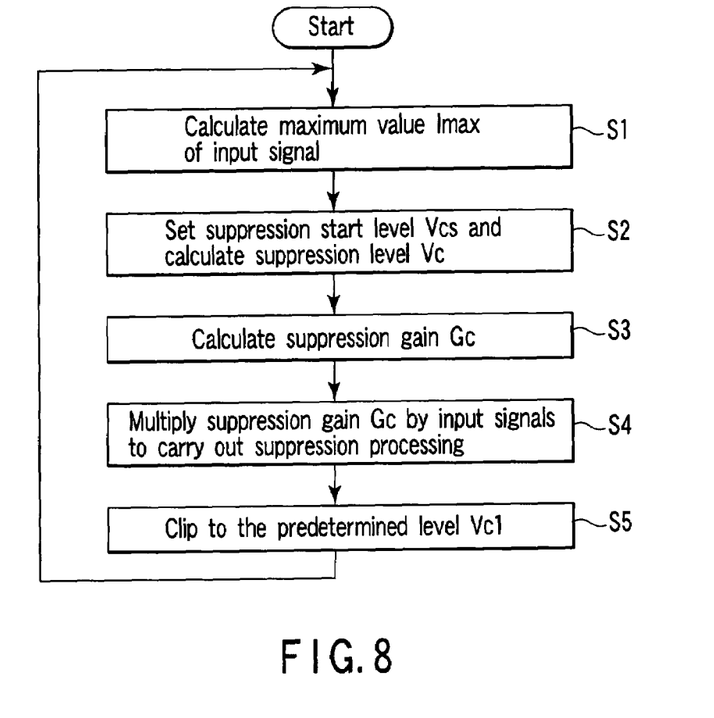
FIG. 8 is a flow chart that indicates the operation procedure of RGB limiting processing in the second embodiment.

FIG. 7 shows the configuration of processor unit in which processing is carried out by CPU 41 that achieves functions of the RGB limiting circuit of FIG. 3 in the display form similar to the configuration of FIG. 3, while FIG. 8 shows a flow chart that indicates a processing method that limits the dynamic range by suppressing R, G, B color signals by CPU 41.

As shown in FIG. 7, m-bit R, G, B signals (shown by Rin, Gin, Bin, respectively) are inputted in CPU 41. These input signals Rin, Gin, Bin are inputted in the suppression gain generation processor unit 42 that creates suppression gain.

The suppression gain Gc created by this suppression gain generation processor unit 42 is multiplied by input signals Rin, Gin, Bin in a multiplication & clip processor unit 43, and furthermore, each signal multiplied is clipped to the predetermined level Vc1 and outputted.

At a maximum value detection processor unit 44 for the input signals Rin, Gin, Bin, which are inputted to the suppression gain generation processing unit 42, the maximum value Imax of the signals Rin, Gin, Bin is detected, and then the detected maximum value Imax is inputted to the suppression level calculation process unit 45.

Using the maximum value Imax and the suppression start level Vcs, the signal level to be suppressed (called the suppression level) Vc is calculated. To this suppression level calculation processor unit 45, a suppression level Vc is set by the entry of parameter Pcs, which determines the suppression start level Vcs.

For example, the suppression level Vc is established by Vc=Imax−Vcs, where the suppression start level Vcs is, for example, $2^n$−Pcs.

In addition, the suppression level Vc is set to zero if it is not more than zero (as discussed later, if the suppression level Vc is zero, the suppression gain becomes 1 and the same processing result as that when no suppression is carried out is obtained). Consequently, in actuality, determination whether or not the suppression level Vc is zero or more, that is, whether or not the maximum Imax is equal to or higher than the suppression start level Vcs, is carried out.

Using the suppression level Vc calculated by this suppression level processor unit 45, the suppression gain Gc is calculated by the suppression gain calculation processor unit 46. For example, this suppression gain Gc is given by:

$$Gc=1-(Vc/2^n)+(Vc/2^n)^2$$

In the second embodiment, a quadratic function of a value obtained by subtracting the suppression start level Vcs from the maximum value Imax of input signals Rin, Gin, Bin is used, to which the value of suppression gain Gc is inputted in this way (where, Vc≧0).

This suppression gain Gc is multiplied by input signals in the multiplication processor unit 47 in the multiplication & clip processor unit 43 and color signals Rco, Gco, Bco suppressed by multiplication processing are created.

These color signals Rco, Gco, Bco are further clipped to the level lower than level Vc1 that corresponds to $2^n$ in the clip processor unit 48, and are outputted as output signals Ro, Go, Bo equal to or lower than n bits.

In the first embodiment, the suppression gain Gc was changed over to the case with gain 1 in accordance with the whether or not maximum value Imax of R, G, B color signals (input signals) exceeds the suppression start level Vcs, but in the second embodiment, both processing to determine whether or not the maximum value Imax exceeds the suppression start level Vcs and processing to establish the suppression gain Gc on the basis of the determination results are carried out simultaneously.

In addition, as explained in the first embodiment, in the second embodiment, too, when the maximum Imax coincides with the suppression start level Vcs (that is Vc=0), as apparent from the above-mentioned Eq. (1), the suppression gain Gc is set to satisfy the condition where the suppression gain Gc is 1.

Referring now to the flow chart of FIG. 8, a processing method to limit (suppress) R, G, B color signals by CPU41 in the second embodiment will be described.

As shown in Step S1, CPU 41 calculates the maximum value Imax at each hour from input signals Rin, Gin, Bin of R, G, B to be inputted in this CPU 41.

As shown in Step S2, CPU 41 sets (calculates) the suppression start level Vcs by parameters and calculates the suppression level Vc using this suppression start level Vcs.

In the following step S3, CPU 41 calculates the suppression gain Gc using the suppression level Vc.

After calculating this suppression gain Gc, in the following step S4, CPU 41 multiplies the suppression gain Gc by input signals Rin, Gin, Bin, and carries out suppression processing for input signals Rin, Gin, Bin, and generates suppressed color signals Rc, Gc, Bc.

These color signals Rc, Gc, Bc are outputted after being clip-processed to be equal or lower than the predetermined level Vc1 in the next step 5. And after this processing, the operation returns to the first step S1, and processing loop from step S1 to step S5 is repeated for the next input signals Rin, Gin, Bin.

The effects of the second embodiment, which operates in this way, are nearly same as those of the first embodiment. That is, when the value obtained by subtracting the suppression start level Vcs from the maximum value Imax of input signals Rin, Gin, Bin is less than zero, the suppression gain Gc has 1 for its gain and by multiplying it by input signals Rin, Gin, Bin, input signals Rin, Gin, Bin are outputted as they are.

On the other hand, when the value obtained by subtracting the suppression start level Vcs from the maximum value Imax of input signals Rin, Gin, Bin is not less than zero, the suppression gain Gc of the above equation (1) is multiplied by input signals Rin, Gin, Bin, and the products are outputted.

Consequently, in the case of the second embodiment, too, for example, in the event that input signals Rin, Gin, Bin are changed as illustrated in the chain double-dashed line of symbol (A) in FIG. 5, output signals Ro, Go, Bo which are expressed by waveforms shown in solid line of symbol (A) in FIG. 5 can be obtained.

Consequently, according to the second embodiment, output signals, which provide smooth output characteristics that can reflect input characteristics more properly, can be obtained. Furthermore, by simultaneously suppressing other color signals by the gain when the maximum value Imax is suppressed, it is possible to prevent white balance from being lost.

Figure 9:
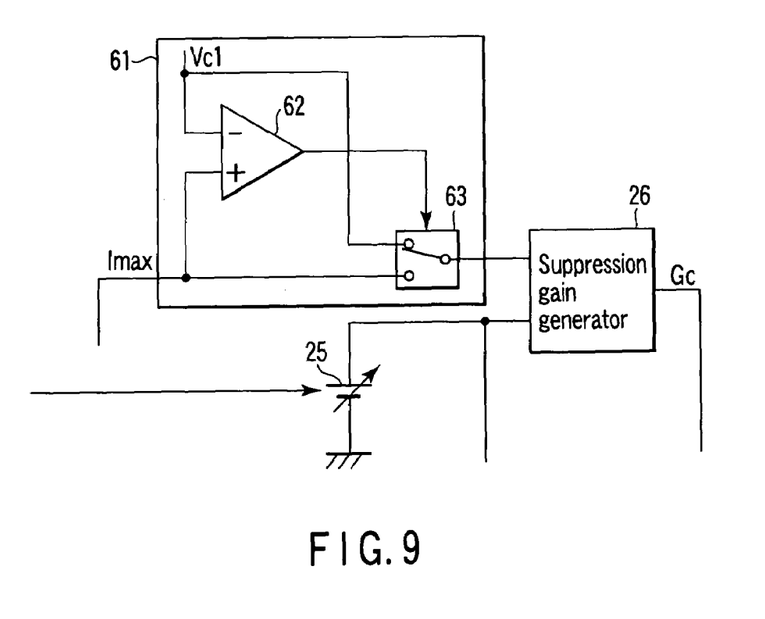
FIG. 9 is an illustration that indicates a configuration of primary portion in the RGB limiting circuit of a modified example.

By the way, for example, the maximum value Imax of color signals to be inputted in the suppression gain generator circuit 26 in the suppression gain generator unit 23 of FIG. 3 may be clamped in such a manner that the maximum value becomes the predetermined level Vc1 using a clamp circuit 61 as shown in FIG. 9.

That is, the maximum value Imax is inputted in a comparator 62 and at the same time, it is inputted in the suppression gain generator circuit 26 via the switch 63. And the maximum value Imax is compared with the predetermined level Vc1 and if it is not more than the predetermined level Vc1, the maximum value Imax is inputted to the suppression gain generator circuit 26 via a switch 63.

On the other hand, when the maximum value Imax is not less than the predetermined level Vc1, the switch 63 is changed over and the predetermined level Vc1 is inputted in the suppression gain generator circuit 26.

In this way, clamping the maximum value Imax of color signals inputted in the suppression gain generator circuit 26 in such a manner as to be equal to lower than the predetermined level Vc1 can maintain the suppression gain Gc to the level that corresponds to the predetermined level Vc1 even when the maximum value Imax is equal to or higher than the predetermined level Vc1.

Consequently, in the event that signals below the predetermined level Vc1 are clipped by the dynamic range clip circuit 31 and are outputted, signals, which are suppressed with white balance not lost, can be definitely obtained.

By the way, the present invention shall not be limited to the above-mentioned embodiments as they are but in the working stages, the invention may be embodied by changing the component elements in various forms without departing from the spirit and scope thereof. In addition, by properly combining multiple component elements disclosed in the above-mentioned embodiments, various inventions may be formed. For example, from all the component elements shown in embodiments, several component elements may be deleted. Furthermore, component elements related to different embodiments may be properly combined.

What is claimed is:

1. A video signal processor comprising:
    a first detector unit configured to detect the maximum signal level in multiple color signals to be inputted;
    a suppression start level setting unit configured to set the suppression start level to start suppression of signal level in the multiple color signals;
    a second detector configured to detect that the maximum signal level in the multiple color signals becomes higher than the suppression start level; and
    a suppression unit configured to suppress the multiple color signals in common by the use of gains which suppress the maximum signal level within the range from the suppression start level to a predetermined level which exceeds the suppression start level.

2. The video signal processor according to claim 1, wherein the suppression start level setting unit is configured in such a manner that the value of suppression start level to be set can be varied.

3. The video signal processor according to claim 1, wherein the suppression unit is configured in such a manner that the greater the value of the maximum signal level which exceeds the suppression start level, the smaller is the value of the gain where the maximum signal level exceeds the suppression start level.

4. The video signal processor according to claim 3, wherein the suppression unit is configured to clamp to the gain of the value which corresponds to the predetermined level where the maximum signal level exceeds the predetermined level.

5. The video signal processor according to claim 1, wherein the multiple color signals are three primary R, G, and B colors.

6. The video signal processor according to claim 1, further comprising
    a TV tuner configured to select a TV signal of the predetermined channel from a received TV broadcasting, and
    a generation unit configured to generate the multiple color signals which correspond to the video from the TV signal of the channel selected by the TV tuner.

7. The video signal processor according to claim 1, further comprising
    a video display device configured to display videos which correspond to the multiple color signals by inputting the multiple color signals outputted from the suppression unit.

8. A color signal suppressing method comprising:
    a maximum signal level detecting step of detecting the maximum signal level in multiple color signals to be inputted;
    a suppression gains setting step of setting suppression gains for suppressing the multiple color signals on the basis of the maximum signal level detected; and
    a signals suppressing step of suppressing the multiple color signals in common by the use of gains which suppress the maximum signal level within the range where the detected maximum signal level attains from a first predetermined level to a second predetermined level which exceeds the first predetermined level.

9. The color signal suppressing method according to claim 8, wherein
    the suppression gains setting step sets the gain to 1 when the maximum signal level is equal or lower than the first predetermined level.

10. The color signal suppressing method according to claim 8, wherein
    the greater the value obtained by subtracting the first predetermined level from the maximum signal level, the smaller is the gain value which is set by the step of suppressing signals.

* * * * *